US011763452B2

(12) United States Patent
Tan et al.

(10) Patent No.: US 11,763,452 B2
(45) Date of Patent: Sep. 19, 2023

(54) TRAINING METHOD, EVALUATION METHOD, ELECTRONIC DEVICE AND STORAGE MEDIUM

(71) Applicant: Guangdong Polytechnic Normal University, Guangzhou (CN)

(72) Inventors: Zhiping Tan, Guangzhou (CN); Yu Tang, Guangzhou (CN); Jiepeng Yang, Guangzhou (CN); Yiqing Fu, Guangzhou (CN); Jinfei Zhao, Guangzhou (CN); Jiahao Li, Guangzhou (CN); Qiwei Guo, Guangzhou (CN); Huasheng Huang, Guangzhou (CN)

(73) Assignee: GUANGDONG POLYTECHNIC NORMAL UNIVERSITY, Guangzhou (CN)

( * ) Notice: Subject to any disclaimer, the term of this patent is extended or adjusted under 35 U.S.C. 154(b) by 0 days.

(21) Appl. No.: 17/816,246

(22) Filed: Jul. 29, 2022

(65) Prior Publication Data

US 2023/0214997 A1 Jul. 6, 2023

(30) Foreign Application Priority Data

Dec. 30, 2021 (CN) .......................... 202111651017.X

(51) Int. Cl.
*G06T 7/00* (2017.01)
*A01G 22/05* (2018.01)
(Continued)

(52) U.S. Cl.
CPC .......... *G06T 7/0012* (2013.01); *A01B 79/005* (2013.01); *A01G 22/05* (2018.02);
(Continued)

(58) Field of Classification Search
CPC ......... G06T 7/0012; G06T 2207/10028; G06T 2207/10036; G06T 2207/20081;
(Continued)

(56) References Cited

U.S. PATENT DOCUMENTS

2018/0259496 A1* 9/2018 McPeek ............... G01N 33/025

FOREIGN PATENT DOCUMENTS

WO WO-2021255458 A1 * 12/2021 ......... G01N 33/0098

OTHER PUBLICATIONS

Zhou, Jie, et al. "FVNet: 3D front-view proposal generation for real-time object detection from point clouds." 2019 12th International Congress on Image and Signal Processing, BioMedical Engineering and Informatics (CISP-BMEI). IEEE, 2019. (Year: 2019).*

* cited by examiner

*Primary Examiner* — Vu Le
*Assistant Examiner* — Tracy Mangialaschi
(74) *Attorney, Agent, or Firm* — Getech Law LLC; Jun Ye

(57) ABSTRACT

The present invention relates to the technical field of field crop cultivation, more particularly to a training method, an evaluation method, an electronic device and a storage medium. According to the present invention, a multispectral three-dimensional point cloud map is obtained through depth information and multispectral information, and the multispectral three-dimensional point cloud map is analyzed by utilizing an FVNet three-dimensional target detection algorithm, thereby acquiring crop feature information. Thus, more comprehensive crop information can be obtained, and a crop state evaluation model constructed based on an artificial neural network can be further trained with the crop feature information.

7 Claims, 1 Drawing Sheet

(51) Int. Cl.
*G06V 10/82* (2022.01)
*G06V 20/10* (2022.01)
*G06V 10/774* (2022.01)
*A01B 79/00* (2006.01)

(52) U.S. Cl.
CPC ............ *G06V 10/774* (2022.01); *G06V 10/82* (2022.01); *G06V 20/188* (2022.01); *G06T 2207/10028* (2013.01); *G06T 2207/10036* (2013.01); *G06T 2207/20081* (2013.01); *G06T 2207/20084* (2013.01); *G06T 2207/30188* (2013.01)

(58) Field of Classification Search
CPC .......... G06T 2207/20084; G06T 2207/30188; A01G 22/05; G06V 10/82; G06V 10/774; G06V 20/188; G06V 10/764; A01B 79/005

See application file for complete search history.

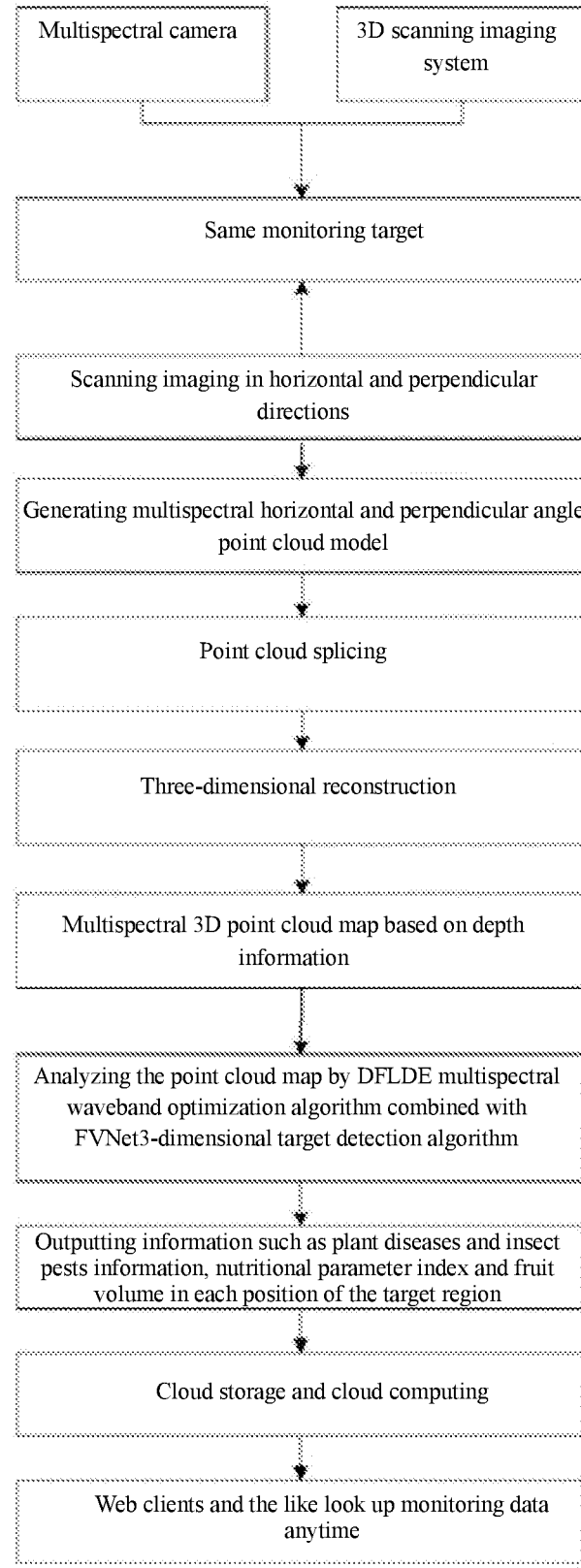

TRAINING METHOD, EVALUATION METHOD, ELECTRONIC DEVICE AND STORAGE MEDIUM

TECHNICAL FIELD

The present invention relates to the technical field of field crop cultivation, more particularly to a training method, an evaluation method, an electronic device and a storage medium.

BACKGROUND

Agriculture is based on plant cultivation, and it is needed to understand plants so as to control vital movement of crops, increase the yield and improve the quality. The current states of most crops can be known by determining surface features of the crops, for example, etiolation and chlorisis of crops suffering from diseases, change of other color and luster such as purple or red of some crops, blue-green of leaf color or metal luster of leaf surface (silver leaf) and the like. Uneven color change on leaf, such as a common floral leaf, is formed by irregular dark and light green colors or yellow and green colors. The color change part in a shape of irregular patch is a spot, and the cyclic color change part is a ring spot or a concentric spot formed by several ring spots and a stripe color change line grain. Only the states of crops are understood can corresponding measures be adopted, so that the crops grow in a given direction. For example, only nutritional parameters of the crops are understood can fertilization be performed reasonably; only moisture relation of the crops is understood can reasonable irrigation be performed; only the needs of the crops to photoperiod or vernalization is understood can the crops be illuminated or shielded manually, and the crop flowering season is controlled; and only disease characteristics of the crops are understood can pesticides be applied with reasonable dosages. As surface characteristics of crops have important reference value to understand the crop states, either cultivation and reproduction or new species improvement is quite necessary to monitor the crops so as to obtain surface characteristics of the crops.

Existing crops are usually planted in a large scale in a shed, and in the planting process, a lot of pesticides need to be sprayed. An existing crop monitoring method usually uses a common monitoring camera to collect surface characteristics of crops and then inputs the collected crop information into an artificial neutral network model, so as to judge the growing status and pest and insect status of the crops. As it is difficult to acquire information of all details such as size of leaf, nutritional elements, lesion location and fruits in the growing process of the crops by the common monitoring camera, the crop information input into the artificial neutral network model is usually incomprehensive. On this basis, the crop states evaluated by the artificial neutral network model are not accurate enough, and the inaccurate evaluation result of the crop states will inevitably affect the subsequent way of cultivating crops. Improper cultivation mode will make the crops grow deviating from the given direction or blossom in a delayed manner/in advance, thereby obtaining smaller fruits. If it is slight, the yield is bad, and if it is severe, severe agricultural loss is caused. The existing crop state evaluation method is unable to accurately evaluate the crop states according to the comprehensive crop information, and influence on subsequent cultivation mode has become one of problems to be urgently solved in the technical field of field crop cultivation. At present, it is an urgent need for a training method capable of evaluating the crop states accurately, an evaluation method, an electronic device and a storage medium.

SUMMARY

The present invention aims to overcome at least one defect in the prior art and provide a training method, an evaluation method, an electronic device and a storage medium so as to solve the problem that the crop states are accurately.

The technical solution adopted by the present invention is as follows:

A training method for an artificial neural network model includes:
  acquiring crop monitor information, the crop monitor information including depth information and multi spectral information;
  generating a point cloud map according to the depth information and the multi spectral information;
  performing point cloud splicing and three-dimensional reconstruction on the point cloud map to obtain a multispectral three-dimensional point cloud map;
  pre-processing the multispectral three-dimensional point cloud map;
  analyzing the pre-processed multispectral three-dimensional point cloud map; based on an FVNet three-dimensional target detection algorithm to acquire crop feature information;
  constructing a training set according to the crop feature information, the training set comprising an original training set and a target training set, wherein the original training set is a data set that stores the crop feature information, and the target training set is a data set that stores marked crop feature information; and
  constructing a crop state evaluation model based on the artificial neural network, and inputting the training set into the crop state evaluation model for training, so as to output a crop state evaluation result.

Specifically, the existing crop state evaluation method cannot perform evaluation according to comprehensive crop information, so that the evaluation model cannot evaluate accurate crop states. In order to acquire the comprehensive crop information and improve the biological state accuracy evaluated, the solution adopts a training method, an evaluation method, an electronic device and a storage medium. First, horizontal and perpendicular scanning imaging is performed respectively in a target region by utilizing a visual unit and a spectral unit so as to respectively obtain depth information and multispectral information of the target region. The visual unit is a stereoscopic vision scanning system which is usually a high definition stereoscopic camera. The spectral unit is a multispectral collecting system which is usually a multispectral camera. Then, a point cloud map is generated according to the depth information and the multispectral information, point cloud splicing and three-dimensional reconstruction are performed on the point cloud map to obtain a multispectral three-dimensional point cloud map. Finally, the multispectral three-dimensional point cloud map is pre-processed to eliminate abnormal values, and the pre-processed multispectral three-dimensional point cloud map is analyzed based on an FVNet three-dimensional target detection algorithm to acquire crop feature information. The crop feature information is marked, and the training set is established according to the marked crop feature information. The training set is input into an artificial neutral network to train, and the current state of the crop corresponding to the crop information is evaluated to output a crop state evaluation result. The FVNet three-dimensional target detection algorithm realizes real-time performance at a speed of 12 milliseconds per cloud point sample. Compared with an existing algorithm that detects images or point cloud of the camera, it has advantages in precision and speed. According to the solution, the multispectral three-dimensional point cloud map is obtained through depth information and multispectral information, and the multispectral three-dimensional point cloud map is analyzed by utilizing an FVNet three-dimensional target detection algorithm, thereby acquiring crop feature information. Thus, more comprehensive crop information can be obtained, and a crop state evaluation model constructed based on an artificial neural network can be further trained with the crop feature information. The crop state is evaluated accurately through the trained crop state evaluation model, so that effective information is provided for subsequent crop cultivation.

Further, the crop feature information includes a lesion location, a leaf area index, a fruit color distribution, a fruit volume and a nutritional parameter.

Specifically, the lesion location, the leaf area index, the fruit color distribution and the fruit volume acquired by utilizing the multispectral information can be used for training the artificial neutral network model. The artificial neutral network model can position the lesion location accurately according to color so as to identify the type of plant diseases and insect pests and extend of harm. The accurate focus information can improve the efficiency of eliminating insect pests and prevent insect pests from damaging the crops. The growing condition of the crops can be understood through the leaf area index (LAI), and the cultivation mode of the crops is adjusted timely. The growth vigor of the crops can be tracked and analyzed in real time through the fruit color distribution and the fruit volume, so that intelligent refined management and planting of the crop growth process is realized. In addition, the nutritional parameters contained in the crops can be acquired according to analysis of the fruit color and the LAI, and corresponding cultivation operation can be adopted according to the nutritional parameters, so that it is guaranteed that the crops grow in expected directions.

Further, after the multispectral three-dimensional point cloud map is pre-processed, and before the pre-processed multispectral three-dimensional point cloud map is analyzed based on an FVNet three-dimensional target detection algorithm to acquire crop feature information, the method further includes:

optimizing high-spectral wave bands in the multispectral three-dimensional point cloud map based on a DFLDE algorithm so as to acquire effective wave bands.

Specifically, DFLDE (Dynamic Fitness Landscape Differential Evolution) is a differential evolution algorithm based on dynamic fitness landscape, and the differential evolution algorithm is a multi-target (continuous variable) optimization algorithm (MOEAs) used for solving the global optimal solution in a multidimensional space. Compared with genetic algorithm, the differential evolution algorithm has the same point that an initial population is generated randomly. By taking a fitness value of each individual in the population as a selection criterion, a main process also includes three steps: variation, intersection and selection. The difference is that the genetic algorithm controls parent hybridization according to the fitness value and a probability value that filial generation generated is selected after variation, and the probability that the individual with large fitness in the maximization problem is selected is great correspondingly. A variation vector of the differential evolution algorithm is generated by a differential vector of a parent generation and is intersected with the differential vector of the parent generation to generate a new individual vector, and is directly selected with its parent generation individual. Obviously, the approximation effect of the differential evolution algorithm relative to the genetic algorithm is more remarkable. High-spectral waveforms of the point cloud map are optimized by using a DFLDE so as to screen effective wave bands therein, so that the accuracy of information extraction can be further improved.

Further, pre-processing the multispectral three-dimensional point cloud map includes:

smoothing, correcting, deriving, normalizing and dimensionality reducing.

Further, it includes:

collecting crop monitor information in a target region by a collecting device, the target region being a region where a crop is located; and inputting the crop information into the trained artificial neural network model to perform crop state evaluation, the artificial neural network model being trained by the training method.

Further, the crop is a strawberry.

Specifically, in the solution, strawberry is selected as the crop. First, a strawberry image carrying the multispectral information is collected and marked. By taking images of fruits with different maturities of batch of strawberries as training samples, the artificial neutral network is trained to obtain a color average classification model of the artificial neutral network for detecting strawberry fruits. Then, an RGB image and a depth image of the target region are acquired. Finally, values R, G and B of the RGB image are taken as input of the color average classification model of the artificial neutral network. Finally, pixel points of the RGB image are classified by virtue of the color average classification model of the artificial neutral network to remove background pixels, so as to obtain an image of a strawberry fruit pixel region. The image of the strawberry fruit pixel region is analyzed. Whether the strawberry is ripe is judged according to a pixel type ratio. If the ratio of the pixel type representing maturity in the image reaches a threshold value, the strawberry is judged ripe and it is no ripe on the contrary. To identify whether the strawberry is ripe makes a user acquire timely so as to collect the strawberry, thereby avoiding overripe of fruits.

Further, the collecting device includes:

a visual unit, configured to collect depth information of the target region; and a spectral unit, configured to collect spectral information of the target region.

Specifically, further, the collecting device further includes:

a navigation unit, configured to plan a path to collect the depth information and the spectral information;

a moving unit, configured to transport other units according to the planned path;

an adjusting unit, configured to adjust collecting angles of the visual unit and the spectral unit;

a communication unit, configured to transmit the depth information and the spectral information to a cloud server; and a display unit, configured to display information of the crop state evaluation for a user to look up.

Further, the collecting device further includes a power supply unit and a master control unit. The above-mentioned all units can be assembled to walk in a shed where strawberries are planted so as to monitor the growth vigor of the strawberries. The navigation unit is configured to plan a moving path of the moving unit and navigate the moving unit. The moving unit usually adopts bionic mechanical legs that can walk freely to avoid obstacles emergently. The communication unit, the power supply unit and the master control unit are usually integrated to the moving unit. The adjusting unit is mounted on the top of the moving unit, and usually adopts a freely stretching guide rail. The guide rail can either stretch upwards or move left and right. The visual unit and the spectral unit are arranged on the adjusting unit, namely, the stereoscopic camera and the three-dimensional scanning imaging system fixed in position are embedded into the guide rail. The moving unit can be autonomously navigated through the navigation unit to walk among strawberry planting rows. The adjusting unit can adjust the positions of the visual unit and the spectral unit, so that the visual unit and the spectral unit obtain good photographing angles. The visual unit and the spectral unit collect the depth information and the multi spectral information of the crops in real time. After collection, the communication unit transmits the depth information and the spectral information to a cloud serve in wireless communication modes such as 5G/4G. The cloud server performs analysis through the artificial neutral network model, a result is then transmitted to a display unit, and the display unit displays the analysis result on a display for a user to look up.

An electronic device includes:

a processor and a memory, the memory having a computer readable instruction stored thereon, the computer readable instruction implementing the training method for an artificial neural network model according to any one above or the crop state evaluation method based on an artificial neural network model according to any one above when being executed by the processor.

A computer readable storage medium, the computer readable storage medium having a processing program stored thereon, wherein the processing program is executable by one or more processors to implement the training method for an artificial neural network model according to any one above or the crop state evaluation method based on an artificial neural network model according to any one above.

Compared with the prior art, the present invention has the beneficial effects: the multispectral three-dimensional point cloud map is obtained through depth information and multispectral information, and the multispectral three-dimensional point cloud map is analyzed by utilizing an FVNet three-dimensional target detection algorithm, thereby acquiring crop feature information. Thus, more comprehensive crop information can be obtained, and a crop state evaluation model constructed based on an artificial neural network can be further trained with the crop feature information. The crop state is evaluated accurately through the trained crop state evaluation model, so that effective information is provided for subsequent crop cultivation. In addition, high-spectral waveforms of the point cloud map are optimized by using a DFLDE so as to screen effective wave bands therein, so that the accuracy of information extraction can be further improved.

BRIEF DESCRIPTION OF DRAWINGS

FIG. 1 is a flow diagram of an evaluation method of the present invention.

DETAILED DESCRIPTION OF EMBODIMENTS

The accompanying drawings of the present invention are merely used for exemplary description and are not construed as limitation to the present invention. In order to better describe the embodiments, some parts in the drawings will be omitted, amplified or lessened and the drawings do not represent the dimensions of actual products. Those skilled in the art can understand that some known structures and description thereof in the drawings may be omitted.

Embodiment 1

The embodiment provides a training method for an artificial neural network model, including:

crop monitor information is acquired, the crop monitor information including depth information and multispectral information;

a point cloud map is generated according to the depth information and the multispectral information;

point cloud splicing and three-dimensional reconstruction are performed on the point cloud map to obtain a multispectral three-dimensional point cloud map;

the multispectral three-dimensional point cloud map is pre-processed;

the pre-processed multispectral three-dimensional point cloud map is analyzed based on an FVNet three-dimensional target detection algorithm to acquire crop feature information;

a training set is constructed according to the crop feature information, the training set including an original training set and a target training set, where the original training set is a data set that stores the crop feature information, and the target training set is a data set that stores marked crop feature information; and a crop state evaluation model is constructed based on the artificial neural network, and the training set is inputted into the crop state evaluation model for training, so as to output a crop state evaluation result.

Specifically, the existing crop state evaluation method cannot perform evaluation according to comprehensive crop information, so that the evaluation model cannot evaluate accurate crop states. In order to acquire the comprehensive crop information and improve the biological state accuracy evaluated, the solution adopts a training method, an evaluation method, an electronic device and a storage medium. First, horizontal and perpendicular scanning imaging is performed respectively in a target region by utilizing a visual unit and a spectral unit so as to respectively obtain depth information and multispectral information of the target region. The visual unit is a stereoscopic vision scanning system which is usually a high definition stereoscopic camera. The spectral unit is a multispectral collecting system which is usually a multispectral camera. Then, a point cloud map is generated according to the depth information and the multispectral information, point cloud splicing and three-dimensional reconstruction are performed on the point cloud map to obtain a multispectral three-dimensional point cloud map. Finally, the multispectral three-dimensional point cloud map is pre-processed to eliminate abnormal values, and the pre-processed multispectral three-dimensional point cloud map is analyzed based on an FVNet three-dimensional target detection algorithm to acquire crop feature information. The crop feature information is marked, and the training set is established according to the marked crop feature information. The training set is input into an artificial neutral network to train, and the current state of the crop corresponding to the crop information is evaluated to output a crop state evaluation result. The FVNet three-dimensional target detection algorithm realizes real-time performance at a speed of 12 milliseconds per cloud point sample. Compared with an existing algorithm that detects images or point cloud of the camera, it has advantages in precision and speed. According to the solution, the multispectral three-dimensional point cloud map is obtained through depth information and multispectral information, and the multispectral three-dimensional point cloud map is analyzed by utilizing an FVNet three-dimensional target detection algorithm, thereby acquiring crop feature information. Thus, more comprehensive crop information can be obtained, and a crop state evaluation model constructed based on an artificial neural network can be further trained with the crop feature information. The crop state is evaluated accurately through the trained crop state evaluation model, so that effective information is provided for subsequent crop cultivation.

Further, the crop feature information includes a lesion location, a leaf area index, a fruit color distribution, a fruit volume and a nutritional parameter.

Specifically, the lesion location, the leaf area index, the fruit color distribution and the fruit volume acquired by utilizing the multispectral information can be used for training the artificial neutral network model. The artificial neutral network model can position the lesion location accurately according to color so as to identify the type of plant diseases and insect pests and extend of harm. The accurate focus information can improve the efficiency of eliminating insect pests and prevent insect pests from damaging the crops. The growing condition of the crops can be understood through the leaf area index (LAI), and the cultivation mode of the crops is adjusted timely. The growth vigor of the crops can be tracked and analyzed in real time through the fruit color distribution and the fruit volume, so that intelligent refined management and planting of the crop growth process is realized. In addition, the nutritional parameters contained in the crops can be acquired according to analysis of the fruit color and the LAI, and corresponding cultivation operation can be adopted according to the nutritional parameters, so that it is guaranteed that the crops grow in expected directions.

Further, after the multispectral three-dimensional point cloud map is pre-processed, and before the pre-processed multispectral three-dimensional point cloud map is analyzed based on an FVNet three-dimensional target detection algorithm to acquire crop feature information, the method further includes:

high-spectral wave bands in the multispectral three-dimensional point cloud map are optimized based on a DFLDE algorithm so as to acquire effective wave bands.

Specifically, DFLDE (Dynamic Fitness Landscape Differential Evolution) is a differential evolution algorithm based on dynamic fitness landscape, and the differential evolution algorithm is a multi-target (continuous variable) optimization algorithm (MOEAs) for solving the global optimal solution in the multi-dimensional space. Compared with genetic algorithm, the differential evolution algorithm has the same point that an initial population is generated randomly. By taking a fitness value of each individual in the population as a selection criterion, a main process also includes three steps: variation, intersection and selection. The difference is that the genetic algorithm controls parent hybridization according to the fitness value and a probability value that filial generation generated is selected after variation, and the probability that the individual with large fitness in the maximization problem is selected is great correspondingly. A variation vector of the differential evolution algorithm is generated by a differential vector of a parent generation and is intersected with the differential vector of the parent generation to generate a new individual vector, and is directly selected with its parent generation individual. Obviously, the approximation effect of the differential evolution algorithm relative to the genetic algorithm is more remarkable. High-spectral waveforms of the point cloud map are optimized by using a DFLDE so as to screen effective wave bands therein, so that the accuracy of information extraction can be further improved.

Further, pre-processing the multispectral three-dimensional point cloud map includes:

smoothing, correcting, deriving, normalizing and dimensionality reducing.

FIG. 1 is a flow diagram of an evaluation method of the present invention, as shown in FIG., including:

the crop monitor information in a target region is collected by a collecting device, the target region being a region where the crop is located;

the crop information is inputted into the trained artificial neural network model to perform crop state evaluation, the artificial neural network model being trained by the training method.

Further, the crop is a strawberry.

Specifically, in the solution, strawberry is selected as the crop. First, a strawberry image carrying the multispectral information is collected and marked. By taking images of fruits with different maturities of batch of strawberries as training samples, the artificial neutral network is trained to obtain a color average classification model of the artificial neutral network for detecting strawberry fruits. Then, an RGB image and a depth image of the target region are acquired. Finally, values R, G and B of the RGB image are taken as input of the color average classification model of the artificial neutral network. Finally, pixel points of the RGB image are classified by virtue of the color average classification model of the artificial neutral network to remove background pixels, so as to obtain an image of a strawberry fruit pixel region. The image of the strawberry fruit pixel region is analyzed. Whether the strawberry is ripe is judged according to a pixel type ratio. If the ratio of the pixel type representing maturity in the image reaches a threshold value, the strawberry is judged ripe and it is no ripe on the contrary. To identify whether the strawberry is ripe makes a user acquire timely so as to collect the strawberry, thereby avoiding overripe of fruits.

Further, the collecting device includes:

a visual unit, configured to collect depth information of the target region; and a spectral unit, configured to collect spectral information of the target region.

Specifically, further, the collecting device further includes:

a navigation unit, configured to plan a path to collect the depth information and the spectral information;

a moving unit, configured to transport other units according to the planned path;

an adjusting unit, configured to adjust collecting angles of the visual unit and the spectral unit;

a communication unit, configured to transmit the depth information and the spectral information to a cloud server; and a display unit, configured to display information of the crop state evaluation for a user to look up.

Further, the collecting device further includes a power supply unit and a master control unit. The above-mentioned all units can be assembled to walk in a shed where strawberries are planted so as to monitor the growth vigor of the strawberries. The navigation unit is configured to plan a moving path of the moving unit and navigate the moving unit. The moving unit usually adopts bionic mechanical legs that can walk freely to avoid obstacles emergently. The communication unit, the power supply unit and the master control unit are usually integrated to the moving unit. The adjusting unit is mounted on the top of the moving unit, and usually adopts a freely stretching guide rail. The guide rail can either stretch upwards or move left and right. The visual unit and the spectral unit are arranged on the adjusting unit, namely, the stereoscopic camera and the three-dimensional scanning imaging system fixed in position are embedded into the guide rail. The moving unit can be autonomously navigated through the navigation unit to walk among strawberry planting rows. The adjusting unit can adjust the positions of the visual unit and the spectral unit, so that the visual unit and the spectral unit obtain good photographing angles. The visual unit and the spectral unit collect the depth information and the multi spectral information of the crops in real time. After collection, the communication unit transmits the depth information and the spectral information to a cloud serve in wireless communication modes such as 5G/4G. The cloud server performs analysis through the artificial neutral network model, a result is then transmitted to a display unit, and the display unit displays the analysis result on a display for a user to look up.

An electronic device includes:

a processor and a memory, the memory having a computer readable instruction stored thereon, the computer readable instruction implementing the training method for an artificial neural network model according to any one above or the crop state evaluation method based on an artificial neural network model according to any one above when being executed by the processor.

A computer readable storage medium, the computer readable storage medium having a processing program stored thereon, wherein the processing program is executable by one or more processors to implement the training method for an artificial neural network model according to any one above or the crop state evaluation method based on an artificial neural network model according to any one above.

Obviously, the embodiments of the present invention are merely examples made for describing the present invention clearly and are not to limit the specific embodiments of the present invention. Any modification, equivalent replacement, improvement, etc. made within the spirit and principle of the claims of the present invention shall be regarded as within the protection scope of the claims of the present invention.

The invention claimed is:

1. A training method for an artificial neural network model, comprising:

acquiring crop monitor information, the crop monitor information comprising depth information and multi-spectral information;

generating a point cloud map according to the depth information and the multispectral information;

performing point cloud splicing and three-dimensional reconstruction on the point cloud map to obtain a multispectral three-dimensional point cloud map;

pre-processing the multispectral three-dimensional point cloud map;

optimizing high-spectral wave bands in the multispectral three-dimensional point cloud map based on a Dynamic Fitness Landscape Differential Evolution (DFLDE) algorithm so as to acquire effective wave bands;

analyzing the pre-processed multispectral three-dimensional point cloud map based on a three-dimensional target detection algorithm to acquire crop feature information;

constructing a training set according to the crop feature information, the training set comprising an original training set and a target training set, wherein the original training set is a data set that stores the crop feature information, and the target training set is a data set that stores marked crop feature information; and constructing a crop state evaluation model based on the artificial neural network, and inputting the training set into the crop state evaluation model for training, so as to output a crop state evaluation result.

2. The training method for an artificial neural network model according to claim 1, wherein the crop feature information comprises a lesion location, a leaf area index, a fruit color distribution, a fruit volume and a nutritional parameter.

3. The training method for an artificial neural network model according to claim 1, wherein the pre-processing the multispectral three-dimensional point cloud map comprises:

smoothing, correcting, deriving, normalizing and dimensionality reducing.

4. A crop state evaluation method based on an artificial neural network model, comprising:

collecting crop monitor information in a target region by a collecting device, the target region being a region where a crop is located; and inputting the crop information into a trained artificial neural network model to perform crop state evaluation, the artificial neural network model being trained by a training method including:

acquiring crop monitor information, the crop monitor information comprising depth information and multi-spectral information;

generating a point cloud map according to the depth information and the multispectral information;

performing point cloud splicing and three-dimensional reconstruction on the point cloud map to obtain a multispectral three-dimensional point cloud map;

pre-processing the multispectral three-dimensional point cloud map;

optimizing high-spectral wave bands in the multispectral three-dimensional point cloud map based on a Dynamic Fitness Landscape Differential Evolution (DFLDE) algorithm so as to acquire effective wave bands;

analyzing the pre-processed multispectral three-dimensional point cloud map based on a three-dimensional target detection algorithm to acquire crop feature information;

constructing a training set according to the crop feature information, the training set comprising an original training set and a target training set, wherein the original training set is a data set that stores the crop feature information, and the target training set is a data set that stores marked crop feature information; and constructing a crop state evaluation model based on the artificial neural network, and inputting the training set into the crop state evaluation model for training, so as to output a crop state evaluation result.

5. The crop state evaluation method based on an artificial neural network model according to claim 4, wherein the crop is a strawberry.

6. The crop state evaluation method based on an artificial neural network model according to claim 4, wherein the collecting device comprises:
   a visual unit, configured to collect depth information of the target region; and
   a spectral unit, configured to collect spectral information of the target region.

7. The crop state evaluation method based on an artificial neural network model according to claim 6, wherein the collecting device further comprises:
   a navigation unit, configured to plan a path to collect the depth information and the spectral information;
   a moving unit, configured to transport other units according to the planned path;
   an adjusting unit, configured to adjust collecting angles of the visual unit and the spectral unit;
   a communication unit, configured to transmit the depth information and the spectral information to a cloud server; and
   a display unit, configured to display information of the crop state evaluation for a user to look up.

* * * * *